United States Patent
Seo et al.

(10) Patent No.: US 9,710,901 B2
(45) Date of Patent: Jul. 18, 2017

(54) APPARATUS AND METHOD FOR MARKING EDIBLE OBJECT

(71) Applicant: QUALICAPS CO., LTD., Yamatokoriyama-shi, Nara (JP)

(72) Inventors: Masahiro Seo, Yamatokoriyama (JP); Hiroshi Sakuramoto, Yamatokoriyama (JP); Katsuaki Shimaoka, Yamatokoriyama (JP); Yuta Igarashi, Yamatokoriyama (JP); Tetsuhisa Ishida, Yamatokoriyama (JP); Motohiro Yagyu, Yamatokoriyama (JP)

(73) Assignee: QUALICAPS CO., LTD., Yamatokoriyama-shi, Nara (JP)

( * ) Notice: Subject to any disclaimer, the term of this patent is extended or adjusted under 35 U.S.C. 154(b) by 18 days.

(21) Appl. No.: 14/889,642

(22) PCT Filed: Jul. 15, 2014

(86) PCT No.: PCT/JP2014/068765
§ 371 (c)(1),
(2) Date: Nov. 6, 2015

(87) PCT Pub. No.: WO2015/008742
PCT Pub. Date: Jan. 22, 2015

(65) Prior Publication Data
US 2016/0180515 A1    Jun. 23, 2016

(30) Foreign Application Priority Data

Jul. 16, 2013  (JP) .................................. 2013-147473

(51) Int. Cl.
*G06K 9/00*    (2006.01)
*G06T 7/00*    (2017.01)
(Continued)

(52) U.S. Cl.
CPC ............. *G06T 7/0004* (2013.01); *A23P 20/00* (2016.08); *A61J 3/007* (2013.01); *B23K 26/0084* (2013.01);
(Continued)

(58) Field of Classification Search
None
See application file for complete search history.

(56) References Cited

U.S. PATENT DOCUMENTS

2010/0189488 A1* 7/2010 Grunenberg ............... B41J 3/28
400/76

FOREIGN PATENT DOCUMENTS

JP    2008-126309 A    6/2008
JP    2013-121432 A    6/2013

OTHER PUBLICATIONS

English Translation of International Search Report of PCT/JP2014/068765.

* cited by examiner

*Primary Examiner* — Hadi Akhavannik
(74) *Attorney, Agent, or Firm* — Muncy, Geissler, Olds & Lowe, P.C.

(57) ABSTRACT

Disclosed is an edible object marking apparatus (1) wherein a carrier means (20) successively conveys an edible object to a detecting means (210), a marking means (220), and a marking inspecting means (230) while holding the edible object, wherein the detecting means (210) captures an image of the edible object to acquire orientational data indicating the orientation of the edible object, the marking means (220) forms a pre-set marking pattern in accordance with the orientation of the edible object based on the orientational data, and the marking inspecting means (230) captures an image of the edible object, extracts marking pattern data, compares the marking pattern data with pre-set reference
(Continued)

pattern data based on the orientational data acquired by the detecting means (210) to thereby inspect marking accuracy. This edible object marking apparatus makes it possible to promptly and easily obtain edible objects provided with an accurate marking.

6 Claims, 6 Drawing Sheets

(51) Int. Cl.
  *B23K 26/00*  (2014.01)
  *B23K 26/03*  (2006.01)
  *B23K 26/08*  (2014.01)
  *A61J 3/00*  (2006.01)
  *B23K 26/082*  (2014.01)
  *A23P 20/00*  (2016.01)
  *B41F 17/36*  (2006.01)
  *B41J 3/407*  (2006.01)
  *A23P 20/25*  (2016.01)

(52) U.S. Cl.
  CPC .......... *B23K 26/032* (2013.01); *B23K 26/082* (2015.10); *B23K 26/0823* (2013.01); *B23K 26/0838* (2013.01); *B41F 17/36* (2013.01); *B41J 3/407* (2013.01); *A23P 2020/253* (2016.08); *G06T 2207/10004* (2013.01); *G06T 2207/30004* (2013.01); *G06T 2207/30128* (2013.01); *G06T 2207/30144* (2013.01); *G06T 2207/30204* (2013.01)

APPARATUS AND METHOD FOR MARKING EDIBLE OBJECT

TECHNICAL FIELD

The present invention relates to an edible object marking apparatus and method for forming a marking pattern on edible objects such as pharmaceutical products and food products.

BACKGROUND ART

The configuration disclosed in Patent Literature 1 is a known example of conventional edible object marking apparatuses. This marking apparatus is configured such that edible objects such as tablets and capsules held in the holding parts of a carrier drum are conveyed to a marking area by the rotation of the carrier drum to perform marking on the edible objects by laser scanning, then the carrier drum is further rotated to convey the edible objects to an imaging area, and the marking is inspected based on the captured image data of the edible objects.

CITATION LIST

Patent Literature

Patent Literature 1: JP 2008-126309A

SUMMARY OF INVENTION

Technical Problem

As edible objects to be provided with a marking, there are scored tablets having a score formed in at least one of the front surface and the back surface of the tablets. In the case of scored tablets, when the direction of the marking does not match the direction of the score or when the marking and the score intersect, the appearance or the distinguishability of the marking may be impaired, and it is therefore necessary to accurately perform marking along the score.

However, since the orientations of the scores of scored tablets rapidly conveyed in large amounts are not uniform, there is a problem that it is difficult to accurately inspect individual markings after detecting the orientation of the score of each scored tablet and performing marking along the score.

Accordingly, an object of the present invention is to provide an edible object marking apparatus and method that make it possible to promptly and easily obtain edible objects provided with an accurate marking.

Solution to Problem

The foregoing object of the present invention is achieved by an apparatus for marking an edible object, comprising a carrier means for conveying the edible object, a detecting means for detecting the edible object, a marking means for forming a marking pattern on the edible object, and a marking inspecting means for inspecting the marking pattern formed on the edible object, the carrier means sequentially conveying the edible object to the detecting means, the marking means, and the marking inspecting means while holding the edible object, wherein the detecting means captures an image of the edible object to acquire orientational data indicating orientation of the edible object;

the marking means forms a pre-set marking pattern in accordance with the orientation of the edible object based on the orientational data; and the marking inspecting means captures an image of the edible object, extracts marking pattern data, and compares the marking pattern data with pre-set reference pattern data based on the orientational data acquired by the detecting means to thereby inspect marking accuracy.

In this edible object marking apparatus, it is preferable that the detecting means and the marking inspecting means each comprise an irradiating part for irradiating the edible object and an imaging part for capturing an image of the edible object, and it is preferable that an angle between an irradiating direction and an imaging direction in the detecting means and an angle between an irradiating direction and an imaging direction in the marking inspecting means are mutually different. For example, the angle between an irradiating direction and an imaging direction in the detecting means can be set larger than the angle between an irradiating direction and an imaging direction in the marking inspecting means.

It is preferable that the marking inspecting means measures a marking position on the edible object when extracting the marking pattern data, and sends the marking means feedback on an amount of shift if the marking position is shifted from a predetermined position.

Moreover, the detecting means is capable of capturing an image of the edible object to acquire the orientational data from a groove-like score formed in the edible object and also acquire regional data for identifying a plurality of regions divided by the score. In this configuration, the marking means is capable of forming a plurality of pre-set marking patterns on the plurality of regions in one-to-one correspondence in accordance with the orientation of the edible object based on the orientational data and the regional data. The marking inspecting means is capable of capturing an image of the edible object, extracting a plurality of marking pattern data, and comparing the plurality of marking pattern data with pre-set reference pattern data based on the orientational data and the regional data acquired by the detecting means to thereby inspect marking accuracy.

Moreover, the foregoing object of the present invention is achieved by a method for marking an edible object, comprising the successive steps of:

a detecting step of detecting the edible object by conveying the edible object by a carrier means while holding the edible object;

a marking step of forming a marking pattern on the edible object; and a marking inspecting step of inspecting the marking pattern formed on the edible object, wherein the detecting step comprises capturing an image of the edible object to acquire orientational data indicating orientation of the edible object;

the marking step comprises forming a pre-set marking pattern in accordance with the orientation of the edible object based on the orientational data; and the marking inspecting step comprises capturing an image of the edible object, extracting marking pattern data, and comparing the marking pattern data with pre-set reference pattern data based on the orientational data acquired in the detecting step to thereby inspect marking accuracy.

In this edible object marking method, it is preferable that the detecting step and the marking inspecting step each comprise capturing an image of the edible object while irradiating the edible object by an irradiating part, and it is preferable that an angle between an irradiating direction and an imaging direction in the detecting step and an angle between an irradiating direction and an imaging direction in the marking inspecting step are mutually different.

When the edible object has a groove-like score, it is preferable that the angle between an irradiating direction and an imaging direction in the detecting step is set so as to be able to identify the groove-like score formed in the edible object from contrast in image data, and it is preferable that the angle between an irradiating direction and an imaging direction in the marking inspecting step is set smaller than the angle between an irradiating direction and an imaging direction in the detecting step so as to make the marking pattern formed on the edible object clear.

Advantageous Effects of Invention

According to the edible object marking apparatus and method of the present invention, edible objects provided with an accurate marking can be promptly and easily obtained.

DESCRIPTION OF EMBODIMENTS

Figure 1:
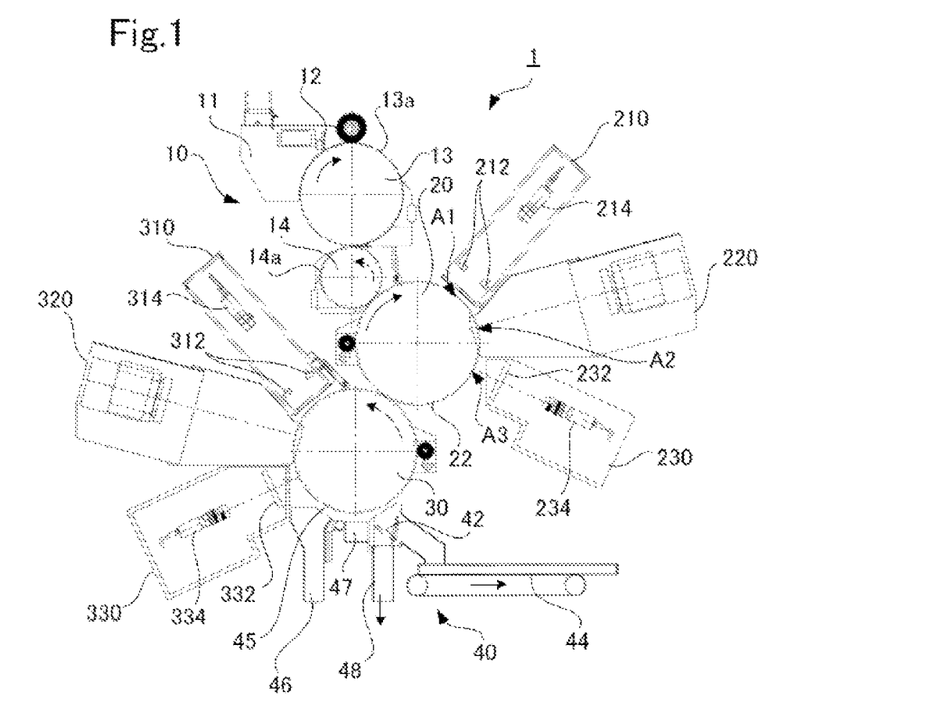
FIG. 1 is a schematic configurational diagram of an edible object marking apparatus according to one embodiment of the present invention.

Below, an embodiment of the present invention will now be described with reference to the appended drawings. FIG. 1 is a schematic configurational diagram of an edible object marking apparatus according to one embodiment of the present invention. As shown in FIG. 1, an edible object marking apparatus 1 comprises a feeding device 10 for supplying edible objects, a first carrier device 20 for receiving the edible objects supplied from the feeding device 10 and conveying the edible objects, a second carrier device 30 for receiving the edible objects supplied from the first carrier device 20 and conveying the edible objects, and an ejector 40 for receiving the edible objects from the second carrier device 30 and ejecting the edible objects to the outside.

The feeding device 10 comprises a hopper 11 to which edible objects having a regular shape, such as tablets, capsules, or hollow capsules, are supplied, a feeder 12 for aligning the edible objects in the hopper 11, and a feeding drum 13 for conveying the edible objects guided by the feeder 12, and the edible objects are supplied from the feeding drum 13 to the first carrier device 20 via an intermediate drum 14. The feeding drum 13 and the intermediate drum 14 comprise a large number of holding parts 13a and 14a composed of recesses arranged in-line in the axial direction and the circumferential direction of the cylindrical outer circumferential surfaces, and are thus capable of suction-holding and conveying the edible objects accommodated in the holding parts 13a and 14a.

Figure 2:
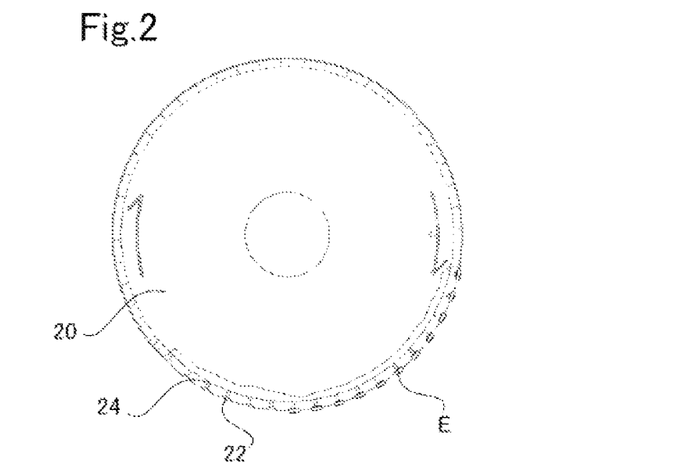
FIG. 2 is an enlarged diagram of principal parts of the edible object marking apparatus shown in FIG. 1.

The first carrier device 20 is formed in a drum shape as with the feeding drum 13 and the intermediate drum 14, and as shown in the partially cutaway view of FIG. 2, a large number of holding parts 22 for holding edible objects E are provided at equal intervals in both circumferential direction and axial direction. The holding parts 22 are each provided with a vacuum hole 24 at the bottom, and by reducing the pressure inside the first carrier device 20 by a vacuum suction device (not shown), the holding parts 22 can suction-hold the edible objects E accommodated in the holding parts 22 via the vacuum holes 24 and convey the edible objects E in the rotational direction of the first carrier device 20 while preventing the orientation of the edible objects E from changing during conveyance.

The second carrier device 30 is configured in the same manner as the first carrier device 20, and holding parts 32 are formed in the drum-shaped outer circumferential surface. The front and back of edible objects conveyed by the first carrier device 20 are reversed when the edible objects are transferred to the second carrier device 30, and the edible objects are then conveyed to the ejector 40.

In the edible object marking apparatus 1 having the above-described configuration, a first detecting device 210, a first marking device 220, and a first marking inspecting device 230 are provided near the first carrier device 20 in this order in the conveying direction of the first carrier device 20.

Figure 3:
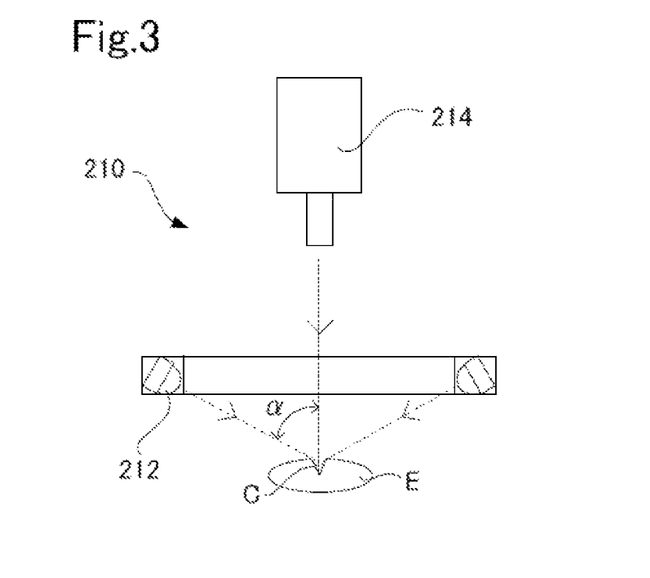
FIG. 3 is a schematic diagram of a first detecting device included in the edible object marking apparatus shown in FIG. 1.

The first detecting device 210 comprises irradiating parts 212 for irradiating edible objects conveyed to a detection area A1 with illumination light, and an imaging part 214 such as a CCD area camera or a CCD line camera for capturing an image of the edible objects from a direction different from the illumination directions of the light irradiating parts 212. The light irradiating parts 212 are, for example, ring illuminators and can uniformly irradiate the edible objects from all sides.

An angle α between the irradiation direction of the irradiating part 212 and the imaging direction of the imaging part 214 shown in FIG. 3 is set at a value suitable for detecting the orientation of an edible object held on the first carrier device 20. For example, as shown in FIG. 3, in the case of identifying the orientation of the edible object E from a groove-like score C formed in the edible object E, illumination light is irradiated from the irradiating parts 212 so as to be able to emphasize the scored portion by forming a shadow in the groove of the score C, then an image is captured by the imaging part 214 from immediately above the score C, and it is thereby possible to clearly identify the direction of the score C (i.e., the orientation of the edible object E). Although the angle α in this case may be suitably set according to the width, depth, and other features of the score C, the angle α is preferably set within the range of 30 to 80 degrees. The irradiation direction of the irradiating part 212 for detecting the direction of the score C is not necessarily limited to an irradiation direction that causes a shadow to be formed in the groove as long as the surface and the groove of the edible object can be identified from contrast in image data. For example, it is also possible to identify the groove by taking advantage of the difference between the reflected lights of the surface and the groove of the edible object, and the angle α in this case is preferably set within the range of 10 to 30 degrees. When the bottom of the groove of the edible object is, for example, flat, it is also possible to set the direction of irradiation from the irradiating part 212 such that the brightness of light reflected from the inner surface of the groove is greater than the brightness of light reflected from the surface of the edible object.

Identification of the orientation of the edible object is not limited to a method that detects a score. For example, when multiple recesses are formed in the edible object, irradiating the edible object so as to emphasize the recesses makes it possible to identify the orientation of the edible object in reference to the recesses as alignment marks. Moreover, when the shape of the edible object is non-circular such as polygonal or elliptical, irradiating the edible object so as to emphasize the outline (contour) of the edible object makes it possible to identify the orientation of the edible object from a part of or all of the outline. Positional data and orientational data, which respectively indicate the positions and the orientations of edible objects detected by the first detecting device 210, are associated with the arrangements of individual edible objects on the first carrier device 20 and output to the first marking device 220 and the first marking inspecting device 230 by way of Ethernet (registered trademark) communication, serial communication, or the like.

The first marking device 220 is a laser marking device and is capable of marking edible objects conveyed to a marking area A2 by laser spot scanning. Coordinate data for a marking pattern composed of characters, numbers, symbols, figures, etc., or a combination thereof in a reference coordinate system is stored in the memory of the first marking apparatus 220 in advance, and by converting the coordinate data in a reference coordinate system into coordinate data in a processing coordinate system based on the positional data and the orientational data of each edible object input from the first detecting device 210 to drive and control the laser spot in the processing coordinate system, a marking pattern can be formed in accordance with the orientation of each edible object.

Examples of the laser of the first marking apparatus 220 include solid-state lasers such as a $YVO_4$ laser, a YLF laser, and a YAG laser, gas lasers such as an excimer laser and a carbon dioxide laser, and liquid lasers such as a dye laser. As for the marking of edible objects, although a preferable example of a method may be introducing an oxide that induces color change, such as titanium oxide, yellow iron sesquioxide, or iron sesquioxide, into the surface of edible objects to cause the surface color of the edible objects to change, the method is not particularly limited so that it is also possible to perform marking by partially carving the surface of edible objects.

The first marking device 220 is a device capable of performing marking in accordance with the orientation of edible objects without moving/rotating the edible objects by converting coordinate data in a reference coordinate system into coordinate data in a processing coordinate system, and may be a device capable of non-contact printing, such as an ink jet printer other than a laser marking device.

Figure 4:
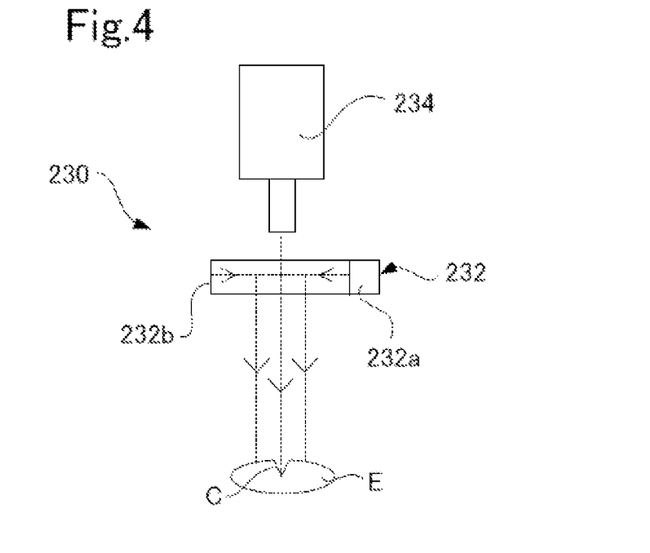
FIG. 4 is a schematic diagram of a first marking inspecting device included in the edible object marking apparatus shown in FIG. 1.
Figure 5:
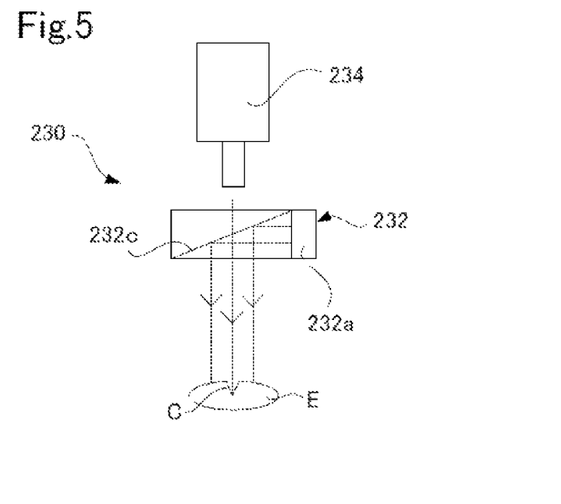
FIG. 5 is a schematic diagram showing a modification of the first marking inspecting device shown in FIG. 4.

The first marking inspecting device 230 comprises an irradiating part 232 for irradiating edible objects conveyed to an inspection area A3 with illumination light, and an imaging part 234 such as a CCD area camera or a CCD line camera for capturing an image of the edible objects. It is preferable that the irradiating part 232 performs irradiation so as to make the marking pattern formed on the surface of the edible objects clear, and, for example, as shown in FIG. 4, the irradiating part 232 is capable of surface emission by causing light irradiated from a light source 232a such as an LED to be diffused by a light guide diffuser 232b. According to this configuration, it is possible to match the irradiation direction of the irradiating part 232 and the imaging direction of the imaging part 234 (i.e., possible to set the angle corresponding to the angle α in FIG. 3 at 0) by arranging the imaging part 234 to capture an image of the edible object E via the light guide diffuser 232b, and it is thus possible to perform coaxial epi-illumination while uniformly diffusing irradiation light. The irradiating part 232 may use a half mirror 232c in place of the light guide diffuser 232b as shown in FIG. 5. Although it is preferable that the irradiating direction of the irradiating part 232 and the imaging direction of the imaging part 234 match as stated above, the irradiating direction and the imaging direction do not need to completely match, and, for example, the angle between the irradiation direction of the irradiating part 232 and the imaging direction of the imaging part 234 (the angle corresponding to the angle α in FIG. 3) may be set within the range of 0 to 30 degrees (more preferably 0 degrees or greater and less than 10 degrees).

The first marking inspecting device 230 has a memory in which reference pattern data corresponding to the marking pattern is stored in advance, and extracts marking pattern data from image data of an edible object acquired by the imaging part 234 and compares the marking pattern data with the reference pattern data based on the orientational data input from the first detecting device 210 to thereby inspect accuracy of the marking on the edible object. Since the pre-set reference pattern data is set in a reference coordinate system, the marking pattern data is corrected (alternatively, the reference pattern data is corrected) based on the positional data and the orientational data of the edible object input from the first detecting device 210 and then compared with the reference pattern data to perform pattern matching or the like. The first marking inspecting device 230 measures the marking position of the edible object when extracting the marking pattern data, and sends the amount of shift to the first marking device 220 if the marking position is shifted from a predetermined position. Accordingly, the first marking device 220 can perform feedback control on the moving part of the laser spot, thus prevents a decrease in marking accuracy resulting from change in environment such as ambient temperature, change over time in machine accuracy, and other changes, and can accurately create a marking containing necessary information in a small space on the surface of a tablet or the like. Feedback control can be performed in a stepwise manner by combining it with statistical processing such as averaging, limitation on correction amount, etc. Alternatively, limitations on feedback control are eased (or lifted) so as to be able to deal with the case where the number of edible object samples on which marking and marking inspection are to be performed is relatively small (e.g., about 10000 tablets), and it is thus possible to promptly and accurately adjust the marking position.

A second detecting device 310, a second marking device 320, and a second marking inspecting device 330 are provided near the second carrier device 30 in this order in the conveying direction of the second carrier device 30. The configurations of the second detecting device 310, the second marking device 320, and the second marking inspecting device 330 are identical to those of the first detecting device 210, the first marking device 220, and the first marking inspecting device 230, with the second detecting device 310 comprising an irradiating part 312 and an imaging part 314, and the second marking inspecting device 330 comprising an irradiating part 332 and an imaging part 334. The second carrier device 30 receives edible objects from the first carrier device 20 and conveys the edible objects, and marking is performed with the second detecting device 310, the second marking device 320, and the second marking inspecting device 330 on the surface opposite to the surface on which a marking pattern was formed during conveyance by the first carrier device 20.

The ejector 40 comprises a sorting part 42 for sorting edible objects based on the results of marking inspection at the first marking inspecting device 230 and the second marking inspecting device 330, and guides only good products to an ejection conveyor 44 for ejection.

Figure 6A:
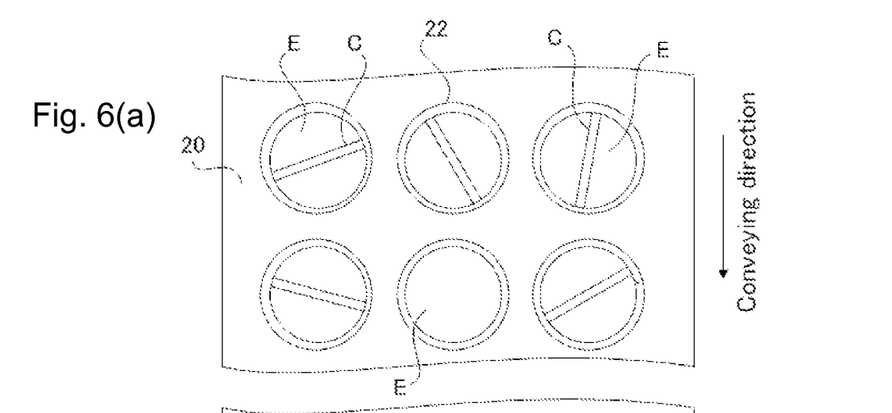
FIGS. 6(a) and 6(b) are explanatory diagrams for a marking method performed with the edible object marking apparatus shown in FIG. 1.

Next, a method for marking edible objects will now be described in which the edible object marking apparatus 1 with the above-described configuration is used. As shown in FIG. 6(a), the edible objects E supplied to the first carrier device 20 from the feeding device 10 are individually accommodated in the holding parts 22 so as to be aligned in the axial direction of the first carrier device 20. At this time, the direction of the score C formed in each edible object E is random.

When the edible objects E are conveyed to the detection area A1 of the first detecting device 210, the imaging part 214 acquires image data of the edible objects E for each row. Since the irradiating part 212 irradiates the edible objects E so as to emphasize the score C as stated above, accurate orientational data of each edible object E can be acquired by the first detecting device 210. For edible objects E, the acquired image data of which does not show the presence of the score C, this fact is output instead of orientational data.

Figure 6B:
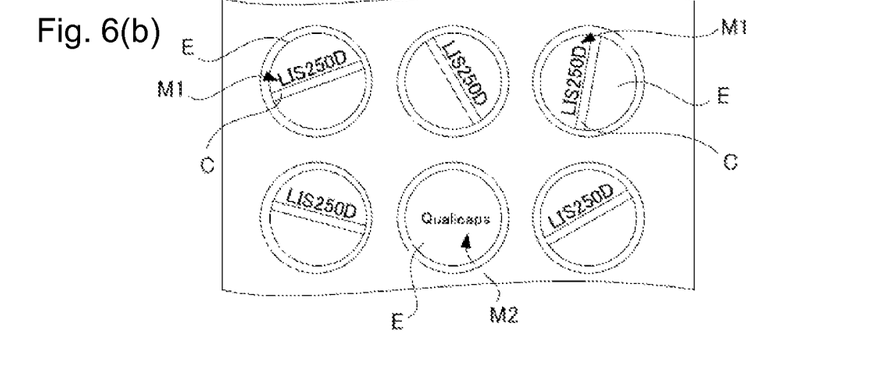

Then, when the edible objects E are conveyed to the marking area A2 of the first marking device 220, marking is performed in accordance with the orientation of each edible object E as shown in FIG. 6(b). Although a marking pattern M1 is formed along the score C in FIG. 6(b), it is sufficient that the marking pattern is formed in consideration of the direction of the score C, and it is not necessary to form the marking pattern along the score C as long as, for example, the marking pattern is provided so as not to overlap the score C. For edible objects E that do not have the score C, a marking pattern M2 different from the above marking pattern M1 may be formed, or no marking pattern may be formed. It is also possible to adopt a configuration in which no marking pattern is formed by the first marking apparatus 220 on the surface where the score C is detected.

Next, when the edible objects E are conveyed to the inspection area A3 of the first marking inspecting device 230, the imaging part 234 acquires image data of the edible objects E for each row. Since the edible objects E are irradiated by the irradiating part 232 such that the marking pattern M1 is clearly shown as stated above, it is possible to extract accurate marking pattern data. Thereafter, the inclination of the marking pattern data is corrected based on the orientational data acquired by the first detector 210, the corrected marking pattern data and pre-set reference pattern data are compared, and marking accuracy is inspected by a known inspection method such as pattern matching.

After marking and inspection are performed on one surface of the edible objects E in this way, the edible objects E are transferred from the first carrier device 20 to the second carrier device 30 and sequentially conveyed to the second detecting device 310, the second marking device 320, and the second marking inspecting device 330, and marking and inspection are thus performed on the other surface of the edible objects E in the same manner as above. That is to say, marking is performed on the edible objects by the second marking device 320 based on the orientational data acquired by the second detecting device 310, and marking accuracy is inspected by the second marking inspecting device 330 based on the orientational data acquired by the second detecting device 310. It is also possible for the second marking device 320 and the second marking inspecting device 330 to perform marking and marking inspection, respectively, based on the orientational data acquired by the first detecting device 210 instead of the orientational data acquired by the second detecting device 310, and, accordingly, the marking directions on the front and back of the edible objects can be matched.

Thereafter, the edible objects E are conveyed from the second carrier device 30 to the ejector 40. Marking quality judgment data of each edible object E is input into the ejector 40 from the first marking inspecting device 230 and the second marking inspecting device 330, and edible objects E judged to be good products are guided to an ejection conveyor 44 via the sorting part 42, while edible objects E judged to be defective products are air-blown at a defective-product ejecting part 45 to be guided to a defective-product ejection chute 46. A defective-product ejection confirmation sensor 47 checks whether the edible objects E judged to be defective products remain in the second carrier device 30, and defective edible objects E, if remaining, are guided by the sorting part 42 to a disposal chute 48.

In order to perform desired marking in accordance with the orientation of edible objects, the edible object marking apparatus 1 of the present embodiment is configured to inspect marking accuracy by the first marking inspecting device 230 (and the second marking inspecting device 330) by taking advantage of the orientational data acquired by the first detecting device 210 (and the second detecting device 310), and it is thus unnecessary to acquire orientational data again by the first marking inspecting device 230 and is possible to shorten the inspection time as well as increase the accuracy of marking inspection.

Score data, in addition to marking pattern data, is also included in the image data acquired by the first marking inspecting device 230 (and the second marking inspecting device 330), and since irradiation conditions are set in accordance with the marking pattern, the score data is likely to become unclear, and inspecting marking accuracy according to such score data possibility results in insufficient accuracy of marking inspection. In the present embodiment, since irradiation conditions of the first detecting device 210 (and the second detecting device 310) and the first marking inspecting device 230 (and the second marking inspecting device 330) are different, these devices can each acquire accurate orientational data and marking pattern data, respectively. Accordingly, the accuracy of inspection can be high, and, consequently, edible objects provided with an accurate marking pattern can be promptly and easily obtained.

Figure 7A:
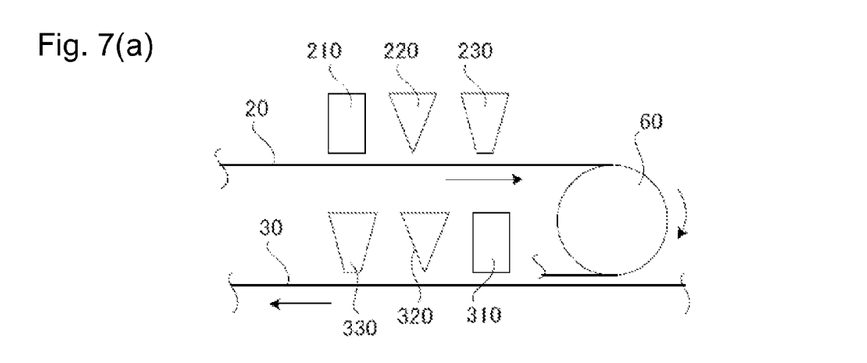
FIGS. 7(a) to 7(c) are diagrams showing modifications of principal parts of the edible object marking apparatus shown in FIG. 1.
Figure 7B:
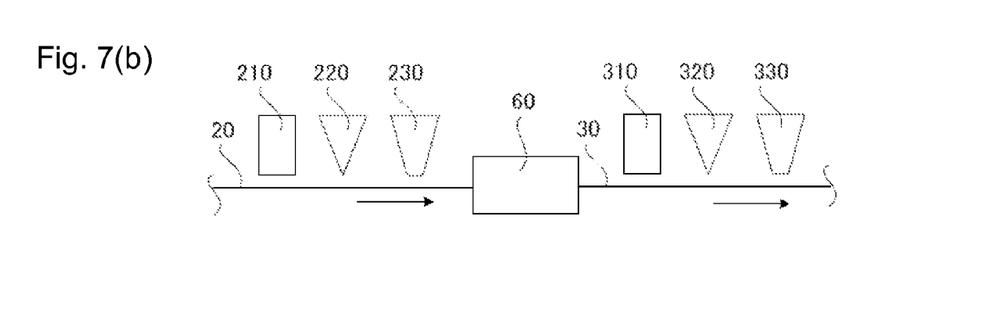
Figure 7C:
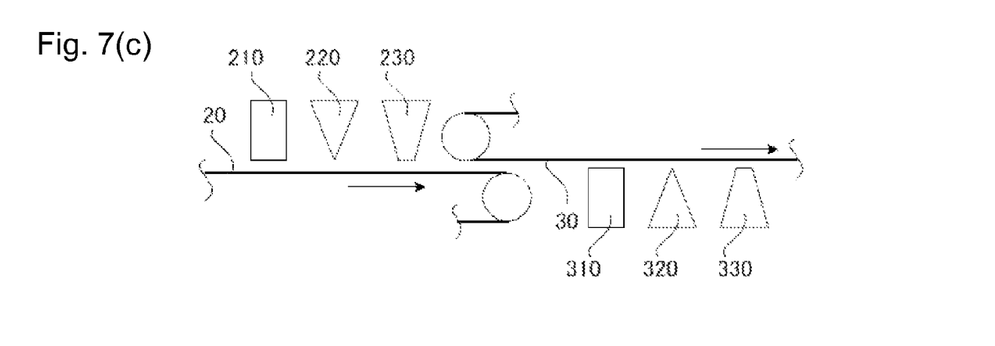

One embodiment of the present invention has been described in detail above, but specific aspects of the present invention are not limited to the above embodiment. For example, while the first carrier device 20 and the second carrier device 30 are both carrier drums in the above embodiment, the carrier devices may be configured differently as long as the orientation of the held edible objects does not change during conveyance. For example, as shown in FIGS. 7(a) and 7(b), the first carrier device 20 and the second carrier device 30 are both configured to be conveyor devices such as slat conveyors or belt conveyors, the front and the back of edible objects horizontally conveyed by the first carrier device 20 are reversed by a reversal mechanism 60, then the edible objects are placed on the second carrier device 30 to be horizontally conveyed, and thus marking can be performed on both front and back surfaces of the edible objects as in the above embodiment. Moreover, as shown in FIG. 7(c), it is also possible to perform marking on both front and back surfaces of edible objects by configuring the second carrier device 30 to be a suction belt having vacuum holes capable of vacuum-sucking the edible objects from above, then suction-holding the edible objects horizontally conveyed by the first carrier device 20 onto the second carrier device 30, and performing marking from below. In FIGS. 7(a) to 7(c), the same components as in FIG. 1 are given the same reference numbers. A configuration may be adopted in which a marking is formed only on one surface of edible objects, and a configuration may be adopted in which the second carrier device 30, the second detecting device 310, the second marking device 320, and the second marking inspecting device 330 are not provided. Moreover, it is not necessarily required that the first detecting device 210, the first marking device 220, and the first marking inspecting device 230 are disposed along the same carrier drum (or conveyor device). For example, in the edible object marking apparatus 1 shown in FIG. 1, a new carrier drum or the like may be disposed between the feeding device 10 and the first carrier device 20 to provide a new detecting device so as to acquire orientational data of edible objects by examining one surface of the edible objects conveyed by the carrier drum. According to this configuration, marking and marking inspection can be performed on the other surface of the edible objects based the orientational data acquired from the aforementioned surface of the edible objects, and, therefore, marking can be performed in accordance with the orientation of the edible objects even when a score or the like that indicates orientation is not present on the surface to be provided with a marking.

Figure 8:
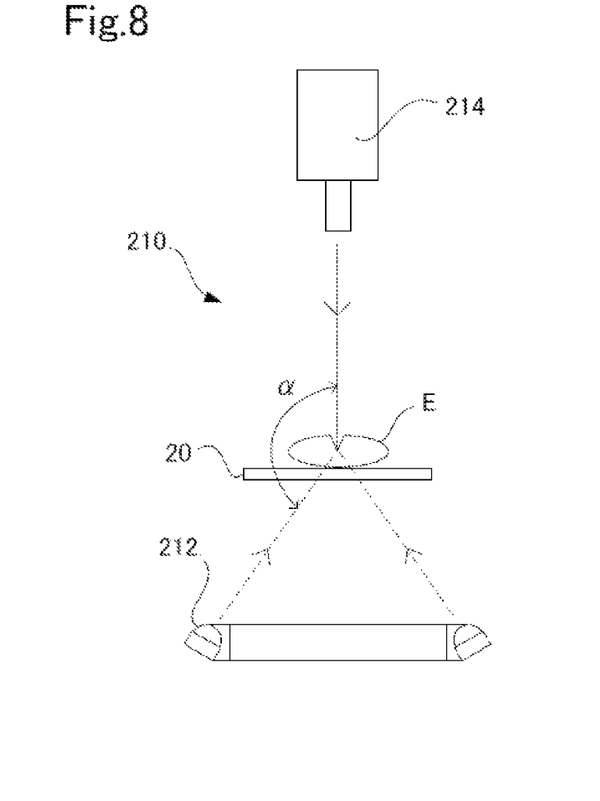
FIG. 8 is a diagram showing another modification of principal parts of the edible object marking apparatus shown in FIG. 1.

It is usually preferable that the angle between the irradiation direction and the imaging direction in the first detecting device 210 and the angle between the irradiation direction and the imaging direction in the first marking inspecting device 230 are different because the purpose of irradiation is different between the devices, but this is not to exclude the case where the angles eventually become identical. The angle between the irradiation direction and the imaging direction may be suitably determined according to the purpose of irradiation. For example, in the case of identifying the orientation of an edible object from the outline (contour) of the edible object by the first detector 210, the angle α between the irradiation direction and the imaging direction can be set at a value greater than the value in the above embodiment as shown in FIG. 8 where transmitted lighting is performed in which the illuminating parts 212 and 212 perform irradiation from below a transparent carrier belt 20. The relationship between the second detecting device 310 and the second marking inspecting device 330 as well is as stated above.

The angle between the irradiation direction and the imaging direction in the first detector 210 is usually larger than the angle between the irradiation direction and the imaging direction in the first marking inspecting device 230, but, for example, in the case of inspecting a marking pattern formed on the inclined surface at the circumference of an edible object, the angle in the first marking inspecting device 230 may be larger than the angle in the first detecting device 210.

Figure 9:
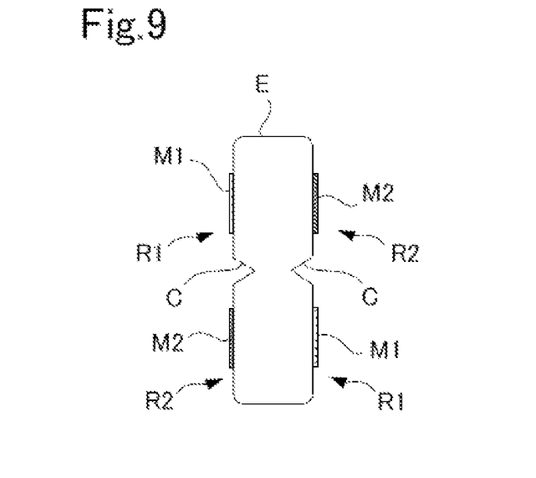
FIG. 9 is a side view showing one example of an edible object provided with markings by the edible object marking apparatus shown in FIG. 1.

For edible objects E having the score C, creating a different marking on each region divided by the score C makes it possible to display multiple kinds of information (such as product name and dosage), and the marking formed in each region can be inspected based on the orientational data acquired by detecting the score C. In this case, it is preferable to determine the positions of the markings on the front and back surfaces of the edible object E such that each halved tablet obtained after dividing the edible object E along the score C can display necessary information. For example, as shown in the side view of FIG. 9, in the case of forming different marking patterns M1 and M2 respectively in a first region R1 and a second region R2 of the edible object E divided by the score C, each halved tablet obtained by dividing the edible object E along the score C includes both marking patterns M1 and M2 by configuring the first region R1 and the second region R2 to be inverted on the front and back surfaces of the edible object E (that is to say, by configuring the first region R1 on the front surface to correspond to the second region R2 on the back surface and the second region R2 on the front surface to correspond to the first region R1 on the back surface), and it is thus possible to prevent loss of information and easily identify the tablet.

Figure 10A:
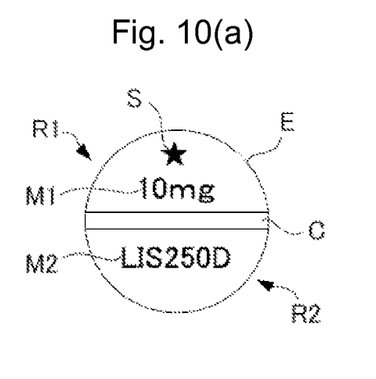
FIGS. 10(a) and 10(b) are diagrams respectively showing the front surface and the back surface of the edible object shown in FIG. 9.
Figure 10B:
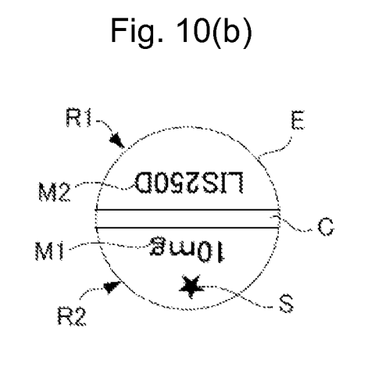

The first region R1 and the second region R2 can be identified as follows: for example, as shown in FIGS. 10(a) and 10(b), a stamp S is formed in advance in the first region R1 on the front and back surfaces of the edible object E while no stamp S is formed in the second region R2, and the first region R1 and the second region R2 are identified based on orientational data and regional data acquired by detecting the score C and the stamp S with the first detecting device 210 and the second detecting device 310. The first marking device 220 and the second marking device 320 form the marking patterns M1 and M2 along the score C in the first region R1 and the second region R2, respectively, based on the orientational data and the regional data of the front and back surfaces of the edible object E. Since the mortar and pestle of a tableting machine for molding the edible object E determine the positions of the score C and the stamp S on the front and back surfaces of the edible object E, there is no possibility of misalignment of the score C and the stamp S between the front and back surfaces of the edible object E, and halved tablets of the edible object having both marking patterns M1 and M2 can be reliably obtained.

The first marking inspecting device 230 and the second marking inspecting device 330 compare the image data of the marking patterns M1 and M2 formed on the front and back surfaces of the edible object E with pre-set reference pattern data based on the orientational data and the regional data of the front and back surfaces of the edible object E to inspect marking accuracy.

The marking patterns M1 and M2 can be formed by ink jet printing other than laser marking. In particular, when a marking pattern is formed so as to partially or entirely overlap the stamp S, ink jet printing can be preferably applied. When the stamp S contains information such as characters and numbers, performing ink jet printing so as to trace the stamp S makes it possible to more clearly display the information of the stamp S.

Regional data may be acquired by the first detecting device 210 and the second detecting device 310 by taking advantage of, for example, the outline (contour) of the edible object E other than the presence or absence of the stamp S. For example, when the edible object E is a triangular tablet, pentagonal tablet, or the like, orientational data and regional data can be acquired from its outline and score C. It is not necessarily required to form the score C in both front and back surfaces of the edible object E, and even when the score C is formed only in one surface, orientational data and regional data can be acquired from the outline of the edible object E, the shape/orientation of the stamp S, etc.

REFERENCE SIGNS LIST

1 Edible object marking apparatus
20 First carrier device
210 First detecting device
212 Irradiating part
214 Imaging part
220 First marking device
230 First marking inspecting device
232 Irradiating part
234 Imaging part
30 Second carrier device
310 Second detecting device
312 Irradiating part
314 Imaging part
320 Second marking device
330 Second marking inspecting device
332 Irradiating part
334 Imaging part

The invention claimed is:

1. An apparatus for marking an edible object, comprising a carrier device that carries the edible object, a detector that is configured to detect the edible object, a marking device that is configured to form a marking pattern on the edible object, and a marking inspection device that is configured to inspect the marking pattern formed on the edible object,
the carrier device sequentially conveying the edible object to the detector, the marking device, and the marking inspection device while holding the edible object, wherein
the detector captures an image of the edible object to acquire orientational data indicating orientation of the edible object;
the marking device forms a pre-set marking pattern in accordance with the orientation of the edible object based on the orientational data;
the marking inspection device captures an image of the edible object, extracts marking pattern data, and compares the marking pattern data with pre-set reference pattern data based on the orientational data acquired by the detector to thereby inspect marking accuracy;
the detector and the marking inspection device each comprise an irradiating part for irradiating the edible object and an imaging part for capturing an image of the edible object; and
an angle between an irradiating direction and an imaging direction in the detector and an angle between an irradiating direction and an imaging direction in the marking inspection device are mutually different.

2. The apparatus for marking an edible object according to claim 1, wherein the angle between an irradiating direction and an imaging direction in the detector is larger than the angle between an irradiating direction and an imaging direction in the marking inspection device.

3. The apparatus for marking an edible object according to claim 1, wherein the marking inspection device measures a marking position on the edible object when extracting the marking pattern data, and sends the marking device feedback on an amount of shift if the marking position is shifted from a predetermined position.

4. The apparatus for marking an edible object according to claim 1, wherein
the detector captures an image of the edible object to acquire the orientational data from a groove-like score formed in the edible object and also acquire regional data for identifying a plurality of regions divided by the score;
the marking device forms a plurality of pre-set marking patterns on the plurality of regions in one-to-one correspondence in accordance with the orientation of the edible object based on the orientational data and the regional data; and
the marking inspection device captures an image of the edible object, extracts a plurality of marking pattern data, and compares the plurality of marking pattern data with pre-set reference pattern data based on the orientational data and the regional data acquired by the detector to thereby inspect marking accuracy.

5. A method for marking an edible object, comprising the successive steps of:
a detecting step of detecting the edible object by conveying the edible object by a carrier device while holding the edible object;
a marking step of forming a marking pattern on the edible object; and
a marking inspecting step of inspecting the marking pattern formed on the edible object, wherein
the detecting step comprises capturing an image of the edible object to acquire orientational data indicating orientation of the edible object;
the marking step comprises forming a pre-set marking pattern in accordance with the orientation of the edible object based on the orientational data;
the marking inspecting step comprises capturing an image of the edible object, extracting marking pattern data, and comparing the marking pattern data with pre-set reference pattern data based on the orientational data acquired in the detecting step to thereby inspect marking accuracy;
the detecting step and the marking inspecting step each comprise capturing an image of the edible object while irradiating the edible object by an irradiating part; and
an angle between an irradiating direction and an imaging direction in the detecting step and an angle between an irradiating direction and an imaging direction in the marking inspecting step are mutually different.

6. The method for marking an edible object according to claim 5, wherein
the angle between an irradiating direction and an imaging direction in the detecting step is set so as to be able to identify an groove-like score formed in the edible object from contrast in image data; and
the angle between an irradiating direction and an imaging direction in the marking inspecting step is set smaller than the angle between an irradiating direction and an imaging direction in the detecting step so as to make the marking pattern formed on the edible object clear.

* * * * *